United States Patent
Gauthier et al.

(10) Patent No.: US 11,030,304 B2
(45) Date of Patent: Jun. 8, 2021

(54) BUFFER OVERFLOW DETECTION BASED ON A SYNTHESIS OF ASSERTIONS FROM TEMPLATES AND K-INDUCTION

(71) Applicant: Oracle International Corporation, Redwood Shores, CA (US)

(72) Inventors: Francois Gauthier, Brisbane (AU); Nathan Keynes, Brisbane (AU); Padmanabhan Krishnan, Brisbane (AU); Cristina Cifuentes, Brisbane (AU); Trung Quang Ta, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 455 days.

(21) Appl. No.: 16/050,828

(22) Filed: Jul. 31, 2018

(65) Prior Publication Data
US 2020/0042697 A1 Feb. 6, 2020

(51) Int. Cl.
*G06F 21/52* (2013.01)
*G06F 8/41* (2018.01)
*G06F 11/36* (2006.01)
*G06F 9/50* (2006.01)

(52) U.S. Cl.
CPC ............ *G06F 21/52* (2013.01); *G06F 8/433* (2013.01); *G06F 8/452* (2013.01); *G06F 11/3608* (2013.01); *G06F 11/3636* (2013.01); *G06F 9/5016* (2013.01); *G06F 2221/033* (2013.01)

(58) Field of Classification Search
CPC .......... G06F 21/52; G06F 8/433; G06F 8/452; G06F 11/3608; G06F 11/3636; G06F 9/5016; G06F 2221/033
See application file for complete search history.

(56) References Cited

U.S. PATENT DOCUMENTS

| | | | |
|---|---|---|---|
| 8,302,086 B2 * | 10/2012 | Li | G06F 11/3608 717/154 |
| 10,032,031 B1 * | 7/2018 | Sharifi Mehr | G06F 21/577 |
| 10,585,660 B2 * | 3/2020 | Murthy | G06F 21/577 |
| 10,657,252 B2 * | 5/2020 | Jordan | G06F 40/12 |
| 2013/0339929 A1 * | 12/2013 | Logozzo | G06F 9/44589 717/124 |

(Continued)

OTHER PUBLICATIONS

Beyer, D. et al., "Boosting k-Induction with Continuously-Refined Invariants", In International Conference on Computer Aided Verification, San Francisco, CA, USA, Jul. 2015; pp. 622-640, Springer 2015 (17 pages).

(Continued)

*Primary Examiner* — Saleh Najjar
*Assistant Examiner* — Devin E Almeida
(74) *Attorney, Agent, or Firm* — Ferguson Braswell Fraser Kubasta PC

(57) ABSTRACT

A method for buffer overflow detection involves obtaining a program code configured to access memory locations in a loop using a buffer index variable, obtaining an assertion template configured to capture a dependency between the buffer index variable and a loop index variable of the loop in the program code, generating an assertion using the assertion template, verifying that the assertion holds using a k-induction; and determining whether a buffer overflow exists using the assertion.

17 Claims, 9 Drawing Sheets

(56) References Cited

U.S. PATENT DOCUMENTS

2015/0363598 A1* 12/2015 Xu .................. G06F 21/566
726/23

OTHER PUBLICATIONS

Brain, M. et al., "Safety Verification and Refutation by k-Invariants and k-Induction", In International Conference on Static Analysis, Saint Malo, France, Sep. 2015; pp. 145-161, Springer 2015 (17 pages).
Cousot, P. et al., "Abstract Interprepation: A Unified Lattice Model for Static Analysis of Programs by Construction on Approximation of Fix-Points", In Proceedings of the 4th ACM SIGACT-SIGPLAN Symposium on Principles of Programming Languages, POPL '77, pp. 238-252, New York, NY, USA, Jan. 1977 (15 pages).
Colon, M.A. et al., "Linear Invariant Generation Using Non-Linear Constraint Solving", In International Conference on Computer Aided Verification, CAV, Boulder, CO, USA, Jul. 2003, Springer 2003, pp. 420-432 (13 pages).
Donaldson, A.F. et al., "Software Verification Using k-Induction", In Proceedings of the 18th International Conference on Static Analysis, SAS, Venice, Italy, Sep. 2011, pp. 351-368, Springer 2011 (17 pages).
Gupta, A. et al., "Invgen: An Efficient Invariant Generator", In Proceedings of the 21st International Conference on Computer Aided Verification, Grenoble, France, Jun. 26-Jul. 2, 2009, pp. 634-640, Springer 2009 (7 pages).
De Moura, L. et al., "Z3: An Efficient SMT Solver", In 14th International Conference on Tools and Algorithms for the Construction and Analysis of Systems, TACAS, Budapest, Hungary, Mar. 29-Apr. 6, 2008, pp. 337-340, Springer 2008 (4 pages).
De Moura, L. et al., "Z3—A Tutorial", 2011, Retrieved from the Internet Oct. 2017 (61 pages) <http://citeseerx.ist.psu.edu/viewdoc.download?doi=10.1.1.225.8231&rep=rep1&type=pdf>.
"Infer", 2011, Accessed Oct. 2017 (7 pages) <http://fbinfer.com>.
Luecke, G.R. et al., A Survey of Systems for Detecting Serial Run-Time Errors. Concurrency and Computation—Practice and Experience, vol. 18, Issue 15, Dec. 2006, pp. 1885-1907 (23 pages).
Logozzo, F. et al., "Pentagons: A Weakly Relational Abstract Domain for the Efficient Validation of Array Accesses" In Proceedings of the 2008 ACM Symposium on Applied Computing, Fortaleza, Ceara, Brazil, Mar. 2008 (23 pages).
Mine Antoine, "The Octagon Abstract Domain", Higher-Order and Symbolic Computation, vol. 19, Issue 1, Mar. 2006, pp. 31-100 (90 pages).
Rocha, H. et al., "Model Checking Embedded C Software Using k-Induction and Invariants", In Embedded Software Verification and Debugging, pp. 159-182, Springer, Apr. 2017 (23 pages).
Rocha, W. et al., "Depthk: A k-Induction Verifier Based on Invariant Inference for C Programs", In International Conference on Tools and Algorithms for the Construction and Analysis of Systems, Apr. 2017, pp. 360-364 (4 pages).
Simon, A. et al., "Two Variables per Linear Inequality as an Abstract Domain", In International Workshop on Logic-Based Program Synthesis and Transformation, Madrid, Spain Sep. 2002, pp. 71-89 (19 pages).
Saxena, P. et al., "Loop-Extended Symbolic Execution on Binary Programs", In Proceedings of the Eighteenth International Symposium on Software Testing and Analysis, ISSTA "09, Jul. 2009, pp. 225-236 (11 pages).
Arnaud Venet, "The Gauge Domain: Scalable Analysis of Linear Inequality Invariants", In 24th International conference on Computer Aided Verification, CAV, Berkeley, CA, USA, Jul. 2012, Springer 2012, pp. 139-154 (16 pages).
(NIST) National Institute of Standards and Technology SAMATE Reference Dataset (SRD) Project, Jan. 2006, http://samate.nist.gov/SRD (2 pages).
(NVD) National Vulnerability Database: "CWE Over Time", Accessed Oct. 2017 (2 pages) https://nvd.nist.gov/vuln/visualizations/cwe-over-time.
"INFERBO: Infer-Based Buffer Overrun Analyzer", Accessed Oct. 2017, (5 pages) https://research.fb.com/inferbo-infer-based-buffer-overrun-analyzer/.
Li, L. et al., "Practical and Effective Symbolic Analysis for Buffer Overflow Detection", In Proceedings of the Eighteenth ACM SIGSOFT International Symposium on Foundations of Software Engineering, FSE "10, Santa Fe, New Mexico, USA, Nov. 2010, pp. 317-326 (10 pages).
Eman, A. et al., "Leveraging Abstract Interpretation for Efficient Dynamic Symbolic Execution", In Proceedings of the 32nd IEEE/ACM Conference on Automated Software Engineering, Urbana-Champaign, IL, USA, Nov. 2017 (11 pages).
De Moura, L. et al., "Z3—A Tutorial", 2011, Retrieved Oct. 2017 (61 pages) <http://citeseerx.ist.psu.edu/viewdoc/download?doi=10.1.1.225.8231&rep=rep1&type=pdf>.

* cited by examiner

Program Code 300

```
1   void foo(int arg) {
2     char *a = malloc(2000);
3     int i = 0;
4     int x = arg > 1 ? 1 : 2;
5     while(i < 1000) {
6       i = i + 1;
7       x = x + 3;
8       a[x] = 1; // buffer overflow
9     }
10  }
```

FIG. 3

Listing 1: Assertion Generation and Verification 600

```
1: procedure GENERATE_ASSERTS(loop, k, constraints, templates)
2:    base = unroll(loop, k-1);
3:    asserts = exec_and_solve(base, constraints, templates);
4:    if asserts ≠ ∅ ∧ K-INDUCTION(()loop, k, constraints, asserts) then
5:       return asserts;
6:    else
7:       symb_constraints = symbolize(constraints);
8:       asserts = exec_and_solve(base, symb_constraints, templates);
9:       if asserts ≠ ∅ ∧ k-induction(loop, k, constraints, asserts) then
10:          return asserts;
11:      else
12:          return No invariant found;
13:      end if
14:   end if
15: end procedure
```

FIG. 6

Listing 2: Split-Case k-Induction 700

```
1: function K-INDUCTION(loop, k, constraints, asserts)
2:     base = unroll(loop, k-1);
3:     base_constraints = exec_and_check(base, constraints, asserts);
4:     if base_constraints ≠ ∅ then
5:         symb_constraints = symbolize(constraints);
6:         symb_constraints = exec_and_assume(base, symb_constraints, asserts);
7:         step = unroll(loop, 1);
8:         if exec_and_check(step, symb_constraints, asserts) ≠ ∅ then
9:             return verified;
10:        else
11:            return error;
12:        end if
13:    else
14:        return error;
15:    end if
16: end function
```

FIG. 7

BUFFER OVERFLOW DETECTION BASED ON A SYNTHESIS OF ASSERTIONS FROM TEMPLATES AND K-INDUCTION

BACKGROUND

Buffer overflows, where a program accesses memory addresses outside allocated memory regions, are known to accounted for a significant percentage of software vulnerabilities. While various methods for discovering buffer overflows exist, many of these solutions suffer from high complexity and/or poor performance.

SUMMARY

In general, in one aspect, one or more embodiments of the invention relate to a method for buffer overflow detection, the method comprising: obtaining a program code configured to access memory locations in a loop using a buffer index variable; obtaining an assertion template configured to capture a dependency between the buffer index variable and a loop index variable of the loop in the program code; generating an assertion using the assertion template; verifying that the assertion holds, using a k-induction; and determining whether a buffer overflow exists using the assertion.

In general, in one aspect, one or more embodiments of the invention relate to a system for buffer overflow detection, the system comprising: a computer processor; an assertion synthesis engine executing on the computer processor configured to: obtain a program code configured to access memory locations in a loop using a buffer index variable; obtain an assertion template configured to capture a dependency between the buffer index variable and a loop index variable of the loop in the program code; generate an assertion using the assertion template; an assertion verification engine executing on the computer processor configured to verify that the assertion holds using a k-induction; and a buffer overflow detection engine executing on the computer processor configured to determine whether a buffer overflow exists using the assertion.

In general, in one aspect, one or more embodiments of the invention relate to a non-transitory computer readable medium comprising computer readable program code for causing a computer system to: obtain a program code configured to access memory locations in a loop using a buffer index variable; obtain an assertion template configured to capture a dependency between the buffer index variable and a loop index variable of the loop in the program code; generate an assertion using the assertion template; verify that the assertion holds, using a k-induction; and determine whether a buffer overflow exists using the assertion.

Other aspects of the invention will be apparent from the following description and the appended claims.

BRIEF DESCRIPTION OF DRAWINGS

FIG. 3 shows an exemplary program code in accordance with one or more embodiments of the invention.

FIGS. 6 and 7 show exemplary implementations of methods in accordance with one or more embodiments of the invention.

DETAILED DESCRIPTION

Figure 1:
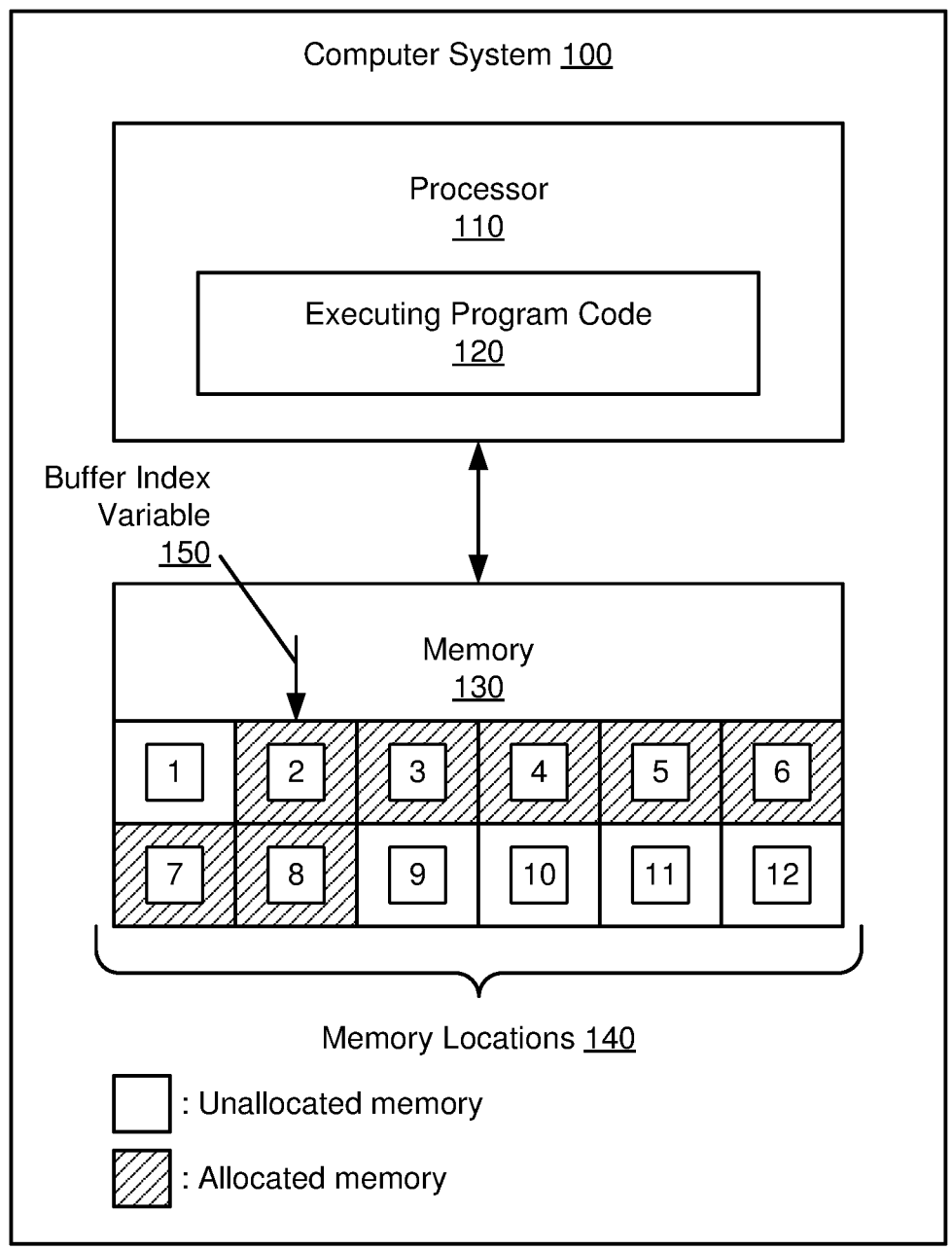
FIG. 1 shows a computer system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to methods and systems for detecting buffer overflows. Buffer overflows may occur when a program accesses a memory address outside an allocated memory region. Buffer overflows can result in erroneous results, software application and/or system crashes and may further be exploited by attackers. One or more embodiments of the invention enable the detection of buffer overflows caused by instructions that are executed within loops. Frequently, a dependency exists between a buffer index variable, used to address memory locations in the allocated memory region, and a loop index variable. Accordingly, the buffer index variable may change as the loop is repeatedly executed. While in a bug-free program code, the buffer index variable may never exceed the range of the allocated memory region, it is not uncommon that in a flawed program code, the buffer index variable, as the loop index variable changes, reaches a value that is no longer in the range of the allocated memory region.

Embodiments of the invention perform the detection of buffer overflows using a multi-step procedure. First, one or more assertions may be synthesized. An assertion, in accordance with an embodiment of the invention, captures the relation between the buffer index variable and the loop index variable. The assertion in accordance with one or more embodiments is, therefore, assumed to be true. Next, the validity of the assertions may be verified to show that the assertion holds for all executions of the loop. Subsequently, the assertion may be used to detect buffer overflows in the program code. This static analysis of program code in a non-runtime environment for the potential for overflow errors is described in detail below with reference to the subsequently discussed system diagrams, flowcharts and examples.

Turning to FIG. 1, a computer system in accordance with one or more embodiments of the invention is shown. The computer system (100) includes a processor (110) and a memory (130). Those skilled in the art will appreciate that the computer system (100) may include various other elements, e.g., elements such as those of the computing system discussed with reference to FIGS. 9A and 9B. The computer system (100), in accordance with one or more embodiments of the invention, provides a run-time environment for the execution of a program code (120).

Figure 9A:
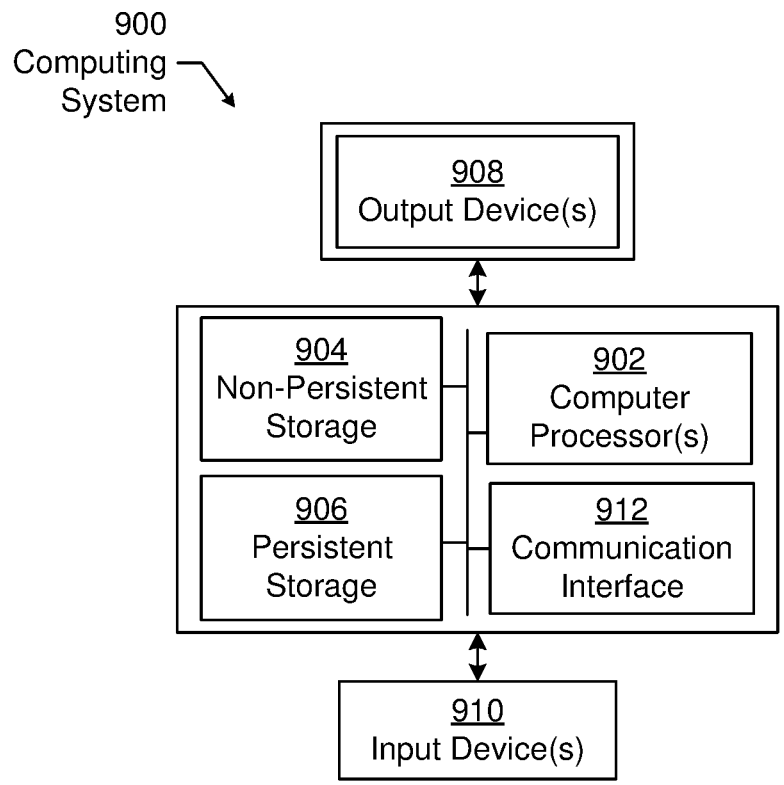
FIGS. 9A and 9B show computing systems in accordance with one or more embodiments of the invention.

The processor (110) may similar to the computer processor (902) in FIG. 9A and may be any type of physical or virtual processor capable of executing a program code (120). The program code may include a set of instructions that are executable by the processor (110). The program code may be a software application, a driver or a tool that may perform any kind of task. In one or more embodiments of the invention, the program code accesses the memory (130). Further, in one or more embodiments of the invention, the memory access occurs in a loop of the program code (120). An exemplary program code is shown in FIG. 3 to illustrate the access of the memory (130) in a loop of the program code (120).

The memory (130) may be any type of volatile memory similar to, for example, the non-persistent storage (904) in FIG. 9. Alternatively, the memory could be non-volatile memory such as the persistent storage (906) in FIG. 9. The memory (130) may include any number of memory locations (140). These memory locations may be allocated (memory locations 2-8 in FIG. 1) or unallocated (memory locations 1 and 9-12 in FIG. 1). An allocated memory location may be reserved for the use by the program code (130). In one or more embodiments of the invention, the program code (120) is supposed to write to allocated memory locations only. However, due to coding flaws, the program code may also write to unallocated memory locations. In one or more embodiments of the invention, the memory location to which the program code (120) is writing is established within the program code by a buffer index variable (150) which points to a memory location or groups of memory locations of the memory (130). The buffer index variable (150) may be altered during the execution of the program code (120) to write to different memory locations. While the buffer index variable is intended to address only allocate memory locations, coding flaws may result in the buffer index variable also addressing unallocated memory locations.

To reduce the likeliness of write operations to unallocated memory locations, thereby causing buffer overrun errors, in one or more embodiments of the invention, the program code (120) is statically analyzed in a non-run-time environment using methods and systems as subsequently described.

Figure 2:
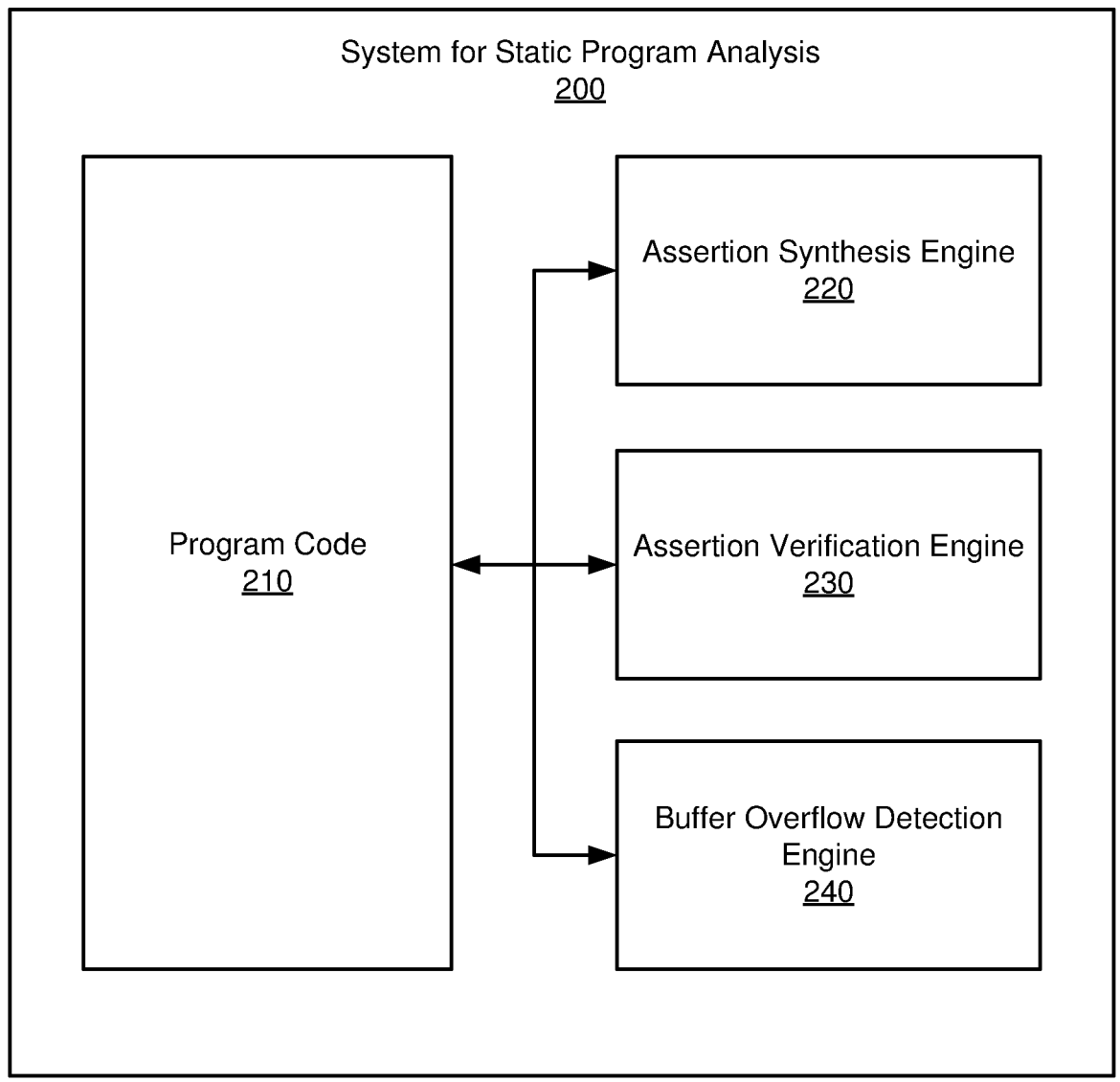
FIG. 2 shows a system for static program analysis in accordance with one or more embodiments of the invention.

Turning to FIG. 2, a system for static program analysis in a non-run-time environment, in accordance with one or more embodiments of the invention, is shown. The system for static program analysis (200) may be used to analyze the program code (120) prior to execution, to reduce the likeliness of, or to rule out, buffer overrun errors. The system for static program analysis (200) may be executing on a computing system similar to the computing system of FIGS. 9A and 9B. The system for static program analysis (200) may include various functional modules, including an assertion synthesis engine (220), an assertion verification engine (230), and a buffer overflow detection engine (240). These engines may operate on the program code (210) to detect whether the program code has the potential to cause buffer overflow errors when executed in the run-time environment shown in FIG. 1. An exemplary program code is provided in FIG. 3.

The assertion synthesis engine (220), in accordance with one or more embodiments of the invention, includes a set of machine-readable instructions (stored on a computer-readable medium) which when executed may synthesize one or more assertions based on the program code (210), as described below with reference to the flowchart of FIG. 4.

The assertion verification engine (230), in accordance with one or more embodiments of the invention, includes a set of machine-readable instructions (stored on a computer-readable medium) which when executed may verify the one or more assertions to show that the assertion holds for all executions of the loop in the program code, as described below with reference to the flowchart of FIG. 5.

The buffer overflow detection engine (240), in accordance with one or more embodiments of the invention, includes a set of machine-readable instructions (stored on a computer-readable medium) which when executed may detect buffer overflows in the program code, using the verified assertions, as described below with reference to the flowchart of FIG. 4.

While FIG. 2 shows a configuration of components, other configurations may be used without departing from the scope of the disclosure. For example, various components may be combined to create a single component. As another example, the functionality performed by a single component may be performed by two or more components that may be communicatively connected using a network connection.

Turning to FIG. 3, an exemplary program code, in accordance with one or more embodiments of the invention, is shown. In line 2, a memory region of 2,000 memory locations is allocated. Assume that these memory locations may be addressed using the buffer index variable, x, where $0 \leq x \leq 1,999$. Further, note that, at line 4, x may be set to either 1 or 2, depending on the value of the argument, arg. Lines 5-9 establish a loop using the loop index variable, i. Within the loop, in line 8, the memory region is accessed using x. Note that at line 7, x is manipulated. x, thus changes as the loop is repeatedly executed, and thus depends on i. Importantly, in the exemplary code, a buffer overflow is generated at line 8. Specifically, x will eventually always become greater than 1,999, the last valid memory location of the allocated memory region.

A method for detecting this buffer overflow must be capable of accommodating the uncertainty associated with the unknown value of arg. Specifically, at line 4, x may be 1 or 2. Further, the method for detecting this buffer overflow must capture the dependency between the buffer index variable, x, and the loop index variable, i.

The subsequently described methods, in accordance with one or more embodiments of the invention are capable of accommodating these and other challenges to detect the potential for buffer overruns in the program code being analyzed. Accordingly, once the methods of FIGS. 4 and 5 have been performed for a program code, the program code may be deemed safe for execution. While FIG. 3 shows a relatively basic example for a program code, those skilled in the art will appreciate that embodiments of the invention are equally suitable to process larger and/or more complex program code.

Figure 4:
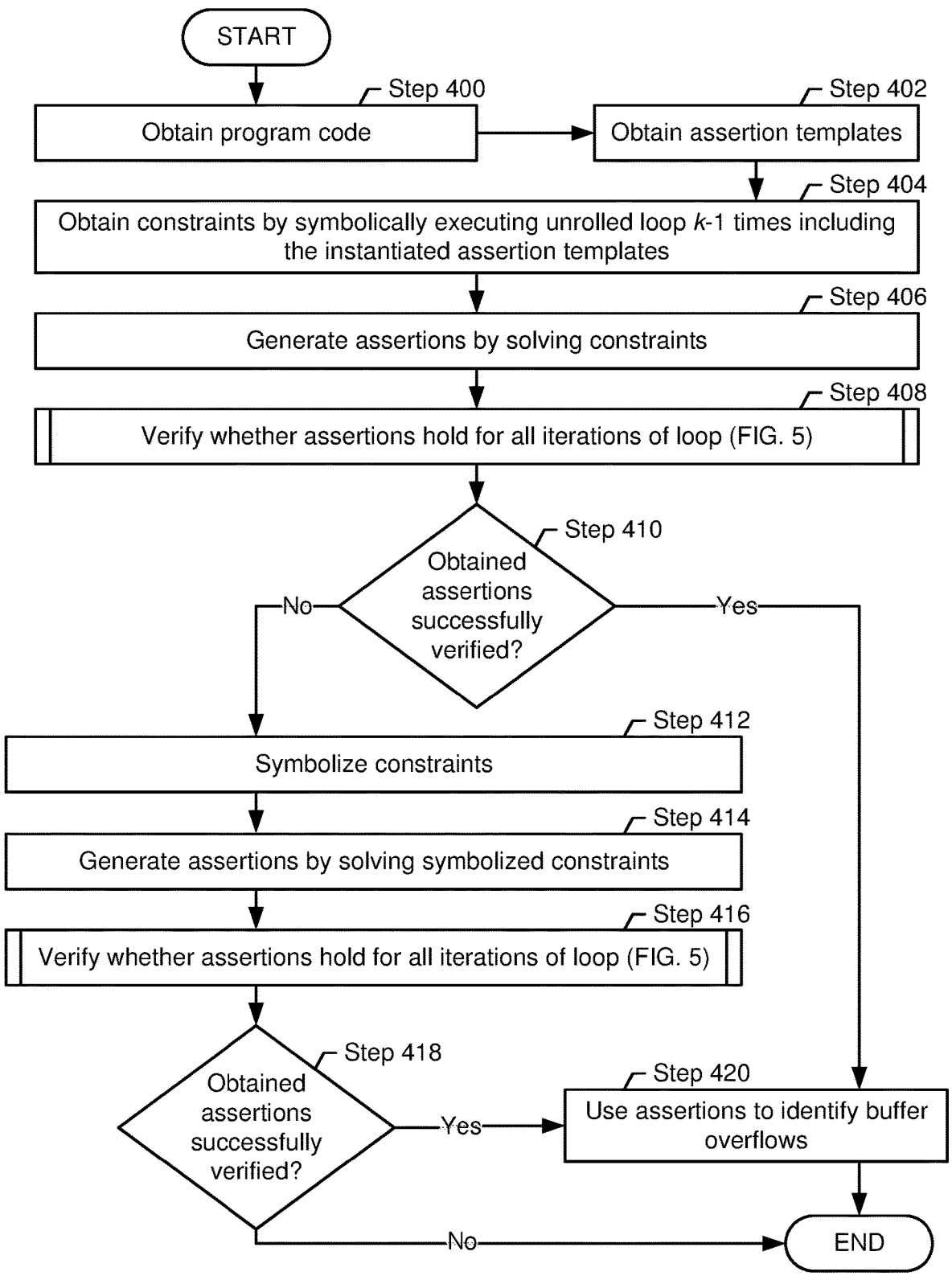
FIGS. 4 and 5 show flowcharts describing methods in accordance with one or more embodiments of the invention.
Figure 5:
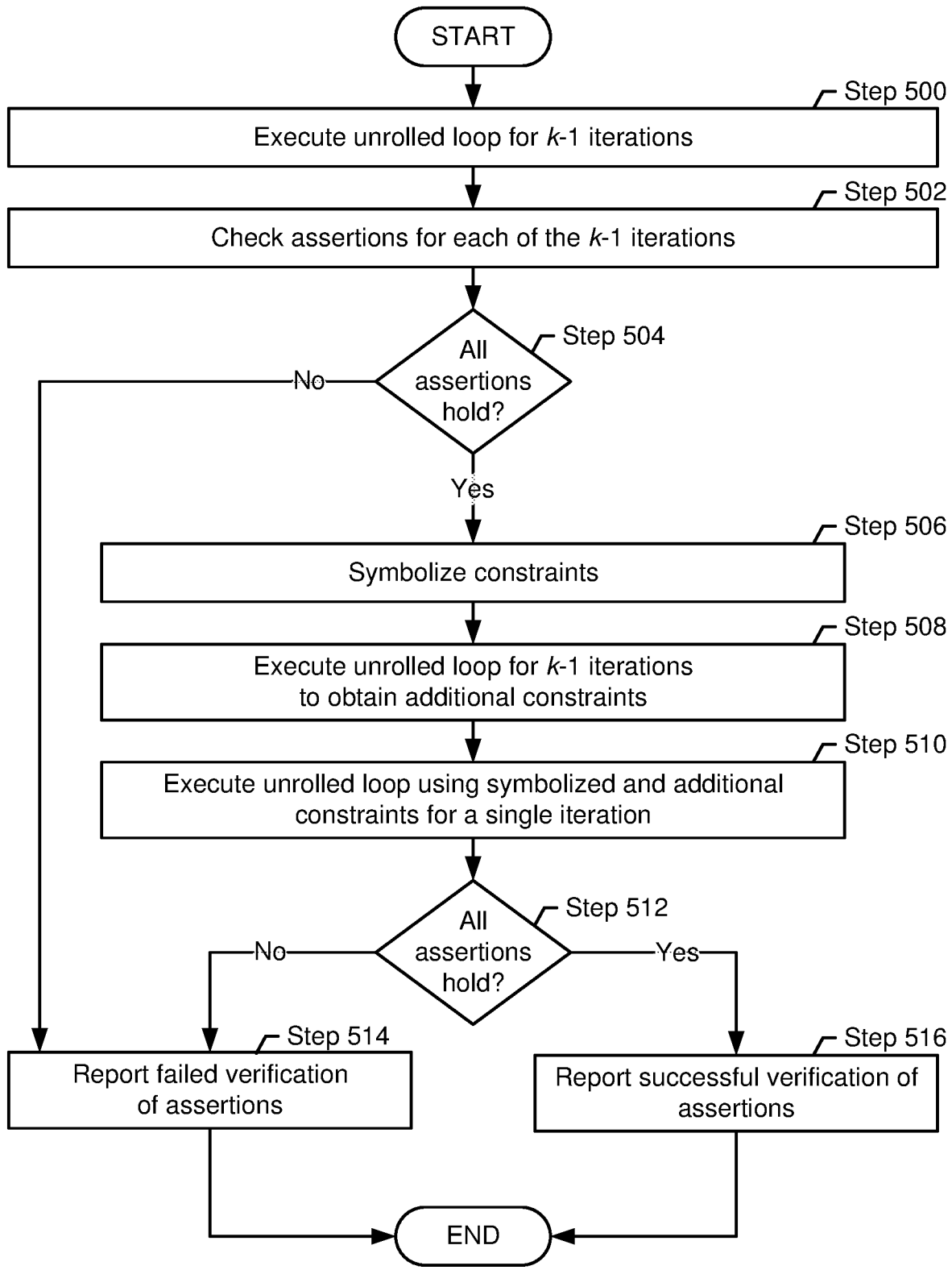

FIGS. 4 and 5 show flowcharts in accordance with one or more embodiments of the invention. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Turning to FIG. 4, a method for identifying buffer overflows, in accordance with one or more embodiments of the invention, is shown. The method may be executed on a program code that includes a loop and memory write operations performed from within the loop. The operations performed by the method are subsequently discussed with reference to the example introduced in FIG. 3. The method combines generating assertions from templates, verifying the assertions using a k-induction, and using the verified assertions to detect buffer overruns, in accordance with one or more embodiments of the invention.

The method consists of a staged implementation to improve computational efficiency. Certain steps (Steps 404-408) are executed using concrete, numerical values which can be processed in a computationally efficient manner. Only if the operations based on concrete values fail, additional steps (Steps 412-416) that involve more computationally demanding additional operations that are based on symbolic values.

Turning to the flowchart, in Step 400, the program code to be analyzed is obtained. An entire program code or a code segment may be obtained. The obtained program code, in accordance with an embodiment of the invention, includes a loop. A loop index variable is associated with the loop. The program code further includes a buffer index variable and memory access operations performed from within the loop using the buffer index variable. The repetitive execution of the loop may affect the buffer index variable. After the execution of Step 400, a code segment such as the example in FIG. 3 may be available for further processing.

In Step 402, assertion templates are obtained. The assertion templates may be predefined. Assertion templates, in accordance with one or more embodiments of the invention, are intended to be used to generate assertions which capture a relationship between the buffer index variable and the loop index variable using coefficients. Generating such assertions from assertion templates may be relatively efficient yet reasonably accurate, as further discussed below.

In one embodiment of the invention, assertion templates that are mathematically relatively simple, e.g., linear assertion templates, are selected. In one or more embodiments of the invention, the following two assertion templates are used:

$$x \geq a \cdot i + x_0 \quad (1), \text{ and}$$

$$x \leq b \cdot i + x_0 \quad (2),$$

where x is the buffer index variable, i is the loop index variable, and $x_0$ is the initial value of x (e.g., before the loop is executed). a and b are initially unknown coefficients to be identified in the subsequent steps. In one or more embodiments of the invention, template (1) serves as an assertion template for generating an assertion representing a lower boundary, and template (2) serves as an assertion template for generating an assertion representing an upper boundary.

In Step 404, constraints are obtained by symbolically executing the unrolled loop k−1 times. With each execution the instantiated assertion templates are included. The parameter k may be set based on considerations including runtime and precision. A higher k may result in an increased runtime and a higher precision, whereas a lower k may result in a reduced runtime and a lower precision. k=2 may be a tradeoff providing a good level of precision without requiring an excessive runtime. Executing Step 404 for the example of FIG. 3, using template (1), initially known constraints (such as $x_0 \geq 1$ and $x_0 \leq 2$), and k=3 results in the generation of the following constraints:

$$x_0 \geq 1 \wedge x_0 \leq 2 \wedge i_1 = 1 \wedge i_1 < 1000 \wedge x_1 = x_0 + 3 \wedge x_1 \geq a \cdot x_0 \wedge i_2 = 2 \wedge i_2 < 1000 \wedge x_2 = x_1 + 3 \wedge x_2 \geq a \cdot i_2 + x_0 \quad (3),$$

with the indices indicating the loop iterations 0 (prior to the first execution of the loop), 1 (first execution of the loop, and 2 (second execution of the loop).

Analogous to the constraints (3), additional constraints may be generated using template (2).

In Step 406, assertions are generated by solving the constraints. The coefficients of the assertions templates may thus be identified. In the previously provided example, solving the constraints results in values for a, b and $x_0$. Two assertions, one for a lower boundary, based on template (1), and one for an upper boundary, based on template (2), are thus obtained. Solving the constraints (3) results in a=3 and $x_0=1$. Substituting a and $x_0$ in template (1) with the values found by the solver yields the assertion $x \geq 3i+1$. Similarly, a second assertion, $x \leq 3i+2$, may be generated for template (2). Any solver that is capable of processing constraints that include numerical, symbolical and/or logical elements may be used. For example, the Z3 solver by Microsoft Research may be used.

In Step 408, a verification is performed to determine whether the assertions hold for all iterations of the loop. The verification is performed using a k-induction-based approach, described in detail with reference to FIG. 5. After completion of Step 408, the computationally efficient first stage of the analysis based on concrete, numerical values is complete.

In Step 410, a determination is made about whether the obtained assertions were successfully verified in Step 408. If the obtained assertions were successfully verified, the execution of the method may directly proceed with Step 420. If the obtained assertions were not successfully verified, the execution of the method may proceed with Step 412. In other words, Step 410, in accordance with one or more embodiments of the invention, determines whether the second, computationally more demanding, stage including Steps 412-416 needs to be executed.

In Step 412, the constraints are symbolized. Consider the previously discussed example of FIG. 3, in particular line 7 of the program code (300). When unrolling the loop, one may obtain $x_1=x_0+3$, $x_2=x_1+3$, etc. $x_1$, $x_2$, etc. are treated as symbolic values. In addition, symbolic values $i_1$, $i_2$, etc. are obtained for the program code (300) when the constraints are symbolized.

In Step 414, assertions are generated by solving the symbolized constraints. Step 414 is performed analogous to Step 406. Accordingly, in Step 414, the coefficients of the assertions templates may be identified based on the symbolized constraints.

In Step 416, a verification is performed to determine whether the assertions, generated from the symbolized constraints, hold for all iterations of the loop. Analogous to Step 408, the verification is performed using a k-induction-based approach, described in detail with reference to FIG. 5.

In Step 418, a determination is made about whether the obtained assertions were successfully verified in Step 416. If the obtained assertions were successfully verified, the execution of the method may proceed with Step 420. If the obtained assertions were not successfully verified, the execution of the method may terminate without an identification of buffer overflows because no valid assertions were found.

In Step 420, the assertions are used to identify buffer overflows. In one or more embodiments of the invention, as previously noted, the assertions form lower and upper bounds for the buffer index variable that are parametric over the loop count. In the previously introduced example, these bounds are defined by the assertions $x \geq 3i+1$ and $x \leq 3i+2$. From these bounds, and over the range of the loop index variable ($0 \leq i \leq 1,000$), the interval for the buffer index variable, $x \in [1, 3002]$ is, thus, determined. Once the range of the buffer index variable is known for the range of the loop index variable, the range of the buffer index variable may be compared against the memory region formed by the allocated memory locations. If the interval for the buffer index variable extends beyond this memory region, a buffer overrun is possible. In the previously introduced example, the allocated memory region includes 2,000 memory locations. Because 3,002>2,000, a buffer overflow is reported.

Turning to FIG. 5, a method for verifying assertions, in accordance with one or more embodiments of the invention, is shown. A k-induction approach is used to prove that an assertion holds for all iterations of the loop. The k-induction approach, in accordance with an embodiment of the invention, assumes the existence of assertions to be verified (generated as described in FIG. 4), and then verifies that the assertions hold. More specifically, a split-case-k-induction is subsequently described. In this approach, the verification is split into a base case and a step case. The base case checks that an assertion is not violated within k loop iterations (Steps 500-504). The step case checks whether, after k successful loop iterations, from an arbitrary state, a further loop iteration can be successfully executed (Steps 506-512).

Turning to the flowchart, in Step 500, the unrolled loop is executed for k−1 iterations. Executing the unrolled loop is similar to Step 404 of FIG. 4. However, unlike in FIG. 4, Step 500 is executed using the assertions, rather than the assertion templates. Accordingly, assertions are obtained for each of the k−1 loop executions. In the previously introduced example, using the assertion $x \geq 3i+1$ based on template (1), the result is $x \geq 4$ for k=1 and $x \geq 7$ for k=2.

In Step 502, each of the resulting assertions for the k−1 iterations are checked. An assertion may be verified against the actual loop. Consider the previously introduced example. During the first execution of the loop x=4 or x=5. During the second execution of the loop, x=7 or x=8. Accordingly, in the example, the resulting assertions are all found to be valid.

In Step 504, a determination is made about whether the assertions all hold for the k−1 iterations. If a determination is made that one or more of the assertions obtained in Step 502 does not hold, the execution of the method may proceed with Step 514, where a failed verification of the assertions is reported. If all assertions are found to hold, the execution of the method may proceed with Step 506.

In Step 506, the constraints are symbolized. Symbolizing the constraints may be performed analogous to Step 412 of FIG. 4.

In Step 508, the unrolled loop for the symbolized constraints is executed for k−1 iterations. The resulting assertions are assumed to be true and are subsequently used as additional constraints.

In Step 510, the unrolled loop for the symbolized constraints and the additional constraints is executed for a single iteration. Assertions are obtained from the execution.

In Step 512, a determination is made about whether the assertions hold for the iteration performed in Step 510. If a determination is made that one or more of the assertions obtained in Step 510 does not hold, the execution of the method may proceed with Step 514, where a failed verification of the assertions is reported. If all assertions are found to hold, the execution of the method may proceed with Step 516, where a successful verification of the assertions is reported.

After completion of the method shown in FIG. 5, the assertions are assumed to hold for any execution of the loop in the program code. Accordingly, the assertions may be used to verify the correctness of the program code.

Turning to FIG. 6, an implementation of a procedure for generating and verifying assertions, in accordance with one or more embodiments of the invention, is shown.

At line 1, the procedure is provided with the loop, k, initial constraints, and the assertion templates. The loop may be, for example, the loop of lines 5-9 of FIG. 3. k may be a user-specified parameter, the initial constraints may be obtained from line 3 (i=0), line 4 (x=1 or x=2) and line 5 (i<1,000) of FIG. 3.

At line 2, the algorithm unrolls the loop.

At line 3, the loop is symbolically executed, using the initial constraints, and with the instantiated assertion templates added as additional constraints. The resulting set of constraints is solved to find appropriate values for coefficient a, b and $x_0$ of the assertion templates.

At line 4, if the solver succeeds in finding values for a, b and $x_0$, then the assertions are verified by k-induction. Code for the k-induction is provided in FIG. 7.

At line 5, if the verification succeeds, the set of verified assertions is returned.

Otherwise, additional operations are performed.

At line 7, the initial set of constraints is symbolized.

At line 8, the loop is symbolically executed, using the symbolized constraints, and with the instantiated assertion templates added as additional constraints. The resulting set of constraints is solved to find appropriate values for coefficient a, b and $x_0$ in the templates.

At line 9, if the solver succeeds in finding values for a, b and $x_0$, the set of assertions is verified by k-induction. Code for the k-induction is provided in FIG. 7.

At line 10, if the verification succeeds, the set of verified assertions is returned.

At line 12, if no successfully verified assertions were found, the method may terminate without providing assertions to be used for detecting buffer overruns.

Turning to FIG. 7, an implementation of a procedure for verifying assertions, in accordance with one or more embodiments of the invention, is shown.

At line 1, the procedure is provided with the loop, k, initial constraints, and the assertions. Accordingly, the provided parameters may be similar to the parameters provided in FIG. 6, with the exception of the assertions: Assertions are provided in line 1 of FIG. 7, whereas assertion templates are provided in line 1 of FIG. 6.

At line 2, the algorithm unrolls the loop for k−1 iterations.

At line 3, the loop is symbolically executed, with the unrolled loop, the constraints and the assertions serving as inputs. The assertions are checked for validity based on the actual values obtained from execution of the loop.

At line 4, if the assertions are found to be valid, the additional operations of lines 5-9 are subsequently performed.

At line 5, the constraints are symbolized.

At line 6, the unrolled loop is symbolically executed again, this time starting with symbolic constraints. In this symbolic execution of the loop, the obtained assertions are assumed to be true and are converted to additional constraints.

At line 7, the loop is unrolled for a single iteration.

At line 8, the loop is symbolically executed for a single iteration. The loop, available constraints, including the additional constraints obtained at line 6, and the assertions serve as inputs. The assertions are checked for validity based on the actual values obtained from execution of the loop. This step thus simulates the execution of the loop from an arbitrary iteration.

At line 9, after the assertions have been found to be valid for the first k executions of the loop (line 4), are assumed to be valid for an arbitrary sequence of iterations [n−k, . . . , n] (line 6), and have been found to hold for the n+1 iteration, the assertions are proven to hold for all iterations. Accordingly, a successful verification of the assertions is reported.

At lines 11 and 14, otherwise a failed verification of the assertions is reported.

Various embodiments of the invention have one or more of the following advantages. Embodiments of the invention enable the detection of buffer overflows. Embodiments of the invention may perform this detection without requiring user involvement. For example, it is unnecessary to annotate code. While embodiments of the invention are described in context of buffer overflow errors, they may be equally applicable to detect other problems scenarios such as memory leaks and use-after free issues.

Embodiments of the invention rely on a combination of an assertion synthesis from assertion templates and k-induction. In one or more embodiments of the invention, the assertions are assumed to never exceed the size of an allocated memory region. If these assertions hold, one may conclude that no buffer overflow will occur during an actual execution of the program code.

One or more embodiments are particularly efficient and provide a high accuracy despite limited computational cost. Specifically, while a conventional synthesis of an assertion is computationally expensive, the use of templates for the synthesis drastically reduces the computational effort while providing a reasonably accurate approximation of safe lower and upper bounds of memory regions. Accordingly, embodiments of the invention are scalable in comparison to other methods that synthesize assertions, while maintaining good accuracy. Embodiments of the invention, thus, improve the functionality of computing systems in a non-routine, non-conventional manner.

In one or more embodiments of the invention, a staged implementation further improves the computational efficiency. Specifically, unless necessary, a complete assessment of buffer overflows may be performed using operations that are based on concrete values which can be processed in a computationally efficient manner. Only if the operations based on concrete values fail, more complex additional operations may be performed based on symbolic values to detect buffer overflows.

Figure 8:
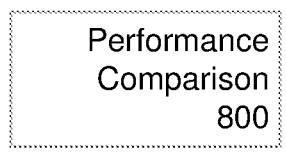
FIG. 8 shows a performance comparison for a buffer overflow detection in accordance with one embodiment of the invention and other buffer overflow detection tools.

FIG. 8 shows a performance comparison (800) for a buffer overflow detection in accordance with one embodiment of the invention and other buffer overflow detection tools. Results obtained using one embodiments of the invention (k-induction) are compared to results obtained using other products (e.g., Parfait, Infer (both examples of static analysis tools)) using the IOWA (developed by the Iowa State University's High Performance Computing Group) and SAMATE (Software Assurance Metrics And Tool Evaluation by the National Institute of Standards and Technology) benchmarks. For the benchmarks shown in FIG. 8, only features that are supported by all three tools (the embodiment of the invention, Parfait and Infer) were tested.

As illustrated in the table of FIG. 8, the embodiment of the invention consistently detects more buffer overflow errors (true positives—TP) than Parfait and Infer, at the expense of additional false positives (FP). For both benchmarks, the set of defects found by embodiments of the invention is a proper superset of the defects found by Parfait and Infer. Thus, the embodiment of the invention does not miss any buffer-overflow issues reported by the other two tools.

For the various benchmarks, the embodiment of the invention takes between 40% to 100% more time than Parfait and between 18% to 200% more time than Infer. While Parfait and Infer are industrial strength tools which are heavily optimized, the benchmarked embodiment of the invention has undergone no optimizations. Accordingly, the initial run-time performance of embodiments of the invention is acceptable in comparison to existing tools and is likely to improve once optimizations are implemented. Thus in the context of finding bugs that are typically hard for static analyzers to detect, the extra time consumed by embodiments of the invention is justified.

Embodiments of the invention may be implemented on a computing system. Any combination of mobile, desktop, server, router, switch, embedded device, or other types of hardware may be used. For example, as shown in FIG. 9A, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 9B:
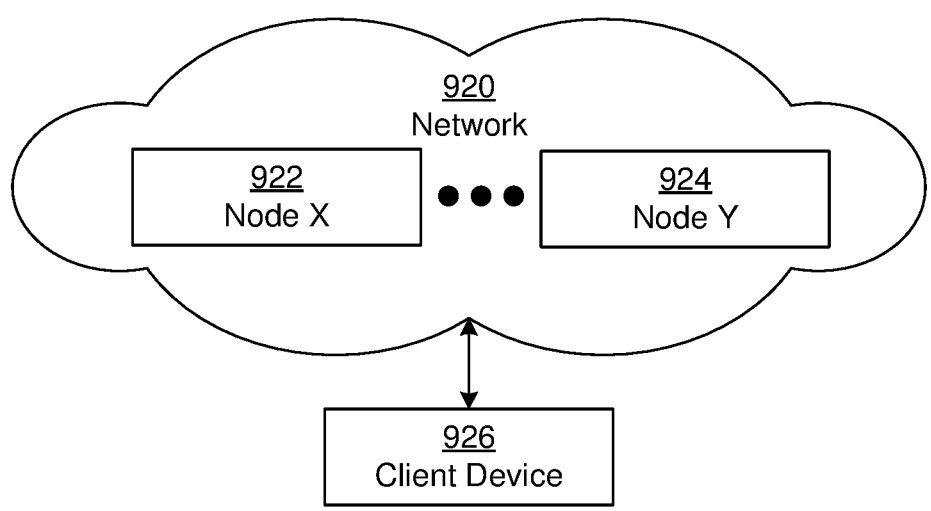

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9B. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9A. Further, the client device (926) may include and/or perform all or a portion of one or more embodiments of the invention.

The computing system or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 9A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 9A and the nodes and/or client device in FIG. 9B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for buffer overflow detection comprising:
obtaining a program code configured to access memory locations in a loop using a buffer index variable;
obtaining an assertion template configured to capture a dependency between the buffer index variable and a loop index variable of the loop in the program code;
generating an assertion using the assertion template;
verifying that the assertion holds, using a k-induction comprising:
making a determination that the assertion holds for k-1 iterations of the loop when executing the loop with constraints based on concrete values, and based on the determination:
symbolizing the constraints,
executing k-1 iterations of the loop using the symbolized constraints to obtain additional constraints,
executing a single iteration of the loop using the symbolized constraints and the additional constraints, and
based on a determination that the assertion holds for the single iteration, concluding that the assertions holds for all executions of the loop; and
determining whether a buffer overflow exists using the assertion.

2. The method of claim 1, wherein determining whether the buffer overflow exists comprises making a determination, using the assertion and a memory allocation specified in the program code, that an execution of the program results in the buffer index variable to point to a memory location beyond the memory allocation during at least one execution of the loop.

3. The method of claim 1,
wherein the assertion template and the assertion are for an upper bound of the buffer index variable, and
wherein a second assertion template is used to generate a second assertion for a lower bound of the buffer index variable.

4. The method of claim 1, wherein the assertion template establishes a linear relationship between the buffer index variable and the loop index variable.

5. The method of claim 1,
wherein the generated assertion establishes a boundary for the buffer index variable, based on the loop index variable, and
wherein the generated assertion, prior to verifying the assertion, is assumed to, but not known to, hold.

6. The method of claim 1, wherein generating the assertion comprises:
obtaining first constraints using concrete values by executing k-1 iterations of the loop, wherein with each iteration, the assertion template is instantiated; and
solving the first constraints to obtain the assertion.

7. The method of claim 6, further comprising:
making a determination, when verifying the assertion, that the assertion does not hold, and based on the determination:
obtaining second constraints using symbolic values by executing k-1 iterations of the loop, wherein with each iteration, the assertion template is instantiated; and
solving the second constraints to obtain the assertion.

8. A system for buffer overflow detection, the system comprising:
a computer processor;
an assertion synthesis engine executing on the computer processor configured to:
obtain a program code configured to access memory locations in a loop using a buffer index variable;
obtain an assertion template configured to capture a dependency between the buffer index variable and a loop index variable of the loop in the program code;
generate an assertion using the assertion template;
an assertion verification engine executing on the computer processor configured to:
verify that the assertion holds, using a k-induction comprising:
making a determination that the assertion holds for k-1 iterations of the loop when executing the loop with constraints based on concrete values, and based on the determination:
symbolizing the constraints,
executing k-1 iterations of the loop using the symbolized constraints to obtain additional constraints,
executing a single iteration of the loop using the symbolized constraints and the additional constraints, and
based on a determination that the assertion holds for the single iteration, concluding that the assertions holds for all executions of the loop; and
a buffer overflow detection engine executing on the computer processor configured to:
determine whether a buffer overflow exists using the assertion.

9. The system of claim 8, wherein determining whether the buffer overflow exists comprises making a determination, using the assertion and a memory allocation specified in the program code, that an execution of the program results in the buffer index variable to point to a memory location beyond the memory allocation during at least one execution of the loop.

10. The system of claim 8,
wherein the generated assertion establishes a boundary for the buffer index variable, based on the loop index variable, and
wherein the generated assertion, prior to verifying the assertion, is assumed to, but not known to, hold.

11. The system of claim 8, wherein generating the assertion comprises:
  obtaining first constraints using concrete values by executing k-1 iterations of the loop, wherein with each iteration, the assertion template is instantiated; and
  solving the first constraints to obtain the assertion.

12. The system of claim 11, further comprising:
  making a determination, when verifying the assertion, that the assertion does not hold, and based on the determination:
    obtaining second constraints using symbolic values by executing k-1 iterations of the loop, wherein with each iteration, the assertion template is instantiated; and
    solving the second constraints to obtain the assertion.

13. A non-transitory computer readable medium comprising computer readable program code for causing a computer system to:
  obtain a program code configured to access memory locations in a loop using a buffer index variable;
  obtain an assertion template configured to capture a dependency between the buffer index variable and a loop index variable of the loop in the program code;
  generate an assertion using the assertion template;
  verify that the assertion holds, using a k-induction comprising:
    making a determination that the assertion holds for k-1 iterations of the loop when executing the loop with constraints based on concrete values, and based on the determination:
      symbolizing the constraints,
      executing k-1 iterations of the loop using the symbolized constraints to obtain additional constraints,
      executing a single iteration of the loop using the symbolized constraints and the additional constraints, and
      based on a determination that the assertion holds for the single iteration, concluding that the assertions holds for all executions of the loop; and
  determine whether a buffer overflow exists using the assertion.

14. The non-transitory computer readable medium of claim 13, wherein determining whether the buffer overflow exists comprises making a determination, using the assertion and a memory allocation specified in the program code, that an execution of the program results in the buffer index variable to point to a memory location beyond the memory allocation during at least one execution of the loop.

15. The non-transitory computer readable medium of claim 13,
  wherein the generated assertion establishes a boundary for the buffer index variable, based on the loop index variable, and
  wherein the generated assertion, prior to verifying the assertion, is assumed to, but not known to, hold.

16. The non-transitory computer readable medium of claim 13, wherein generating the assertion comprises:
  obtaining first constraints using concrete values by executing k-1 iterations of the loop, wherein with each iteration, the assertion template is instantiated; and
  solving the first constraints to obtain the assertion.

17. The non-transitory computer readable medium of claim 16, further comprising:
  making a determination, when verifying the assertion, that the assertion does not hold, and based on the determination:
    obtaining second constraints using symbolic values by executing k-1 iterations of the loop, wherein with each iteration, the assertion template is instantiated; and
    solving the second constraints to obtain the assertion.

* * * * *